G. S. MacDOWELL AND H. A. PERKINS.
STOCK POSITIONING MECHANISM.
APPLICATION FILED MAR. 3, 1921.
1,427,757.
Patented Aug. 29, 1922.
3 SHEETS—SHEET 1.
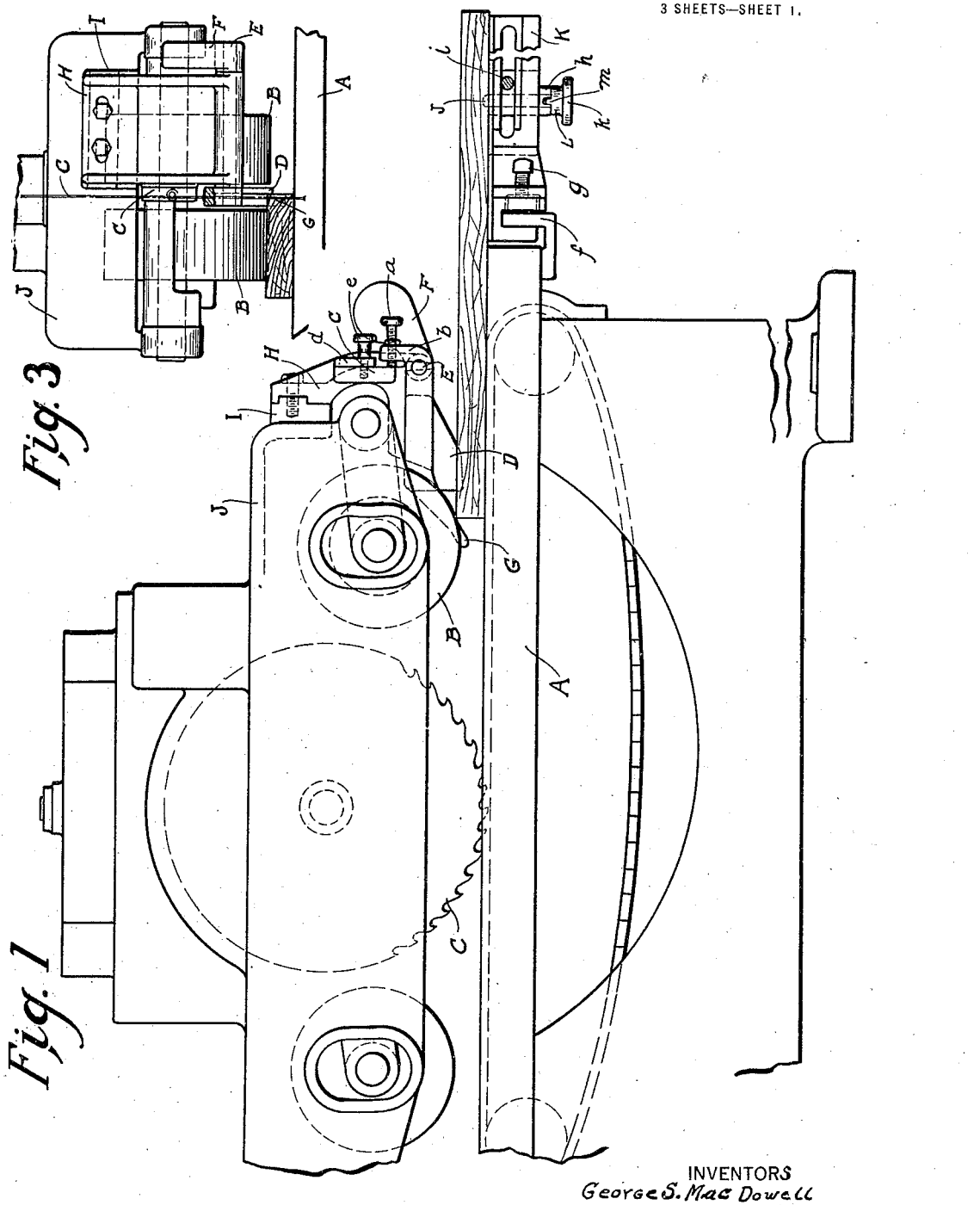
INVENTORS
George S. MacDowell
Hiram A. Perkins.
BY
Harold E. Stonebraker,
THEIR ATTORNEY

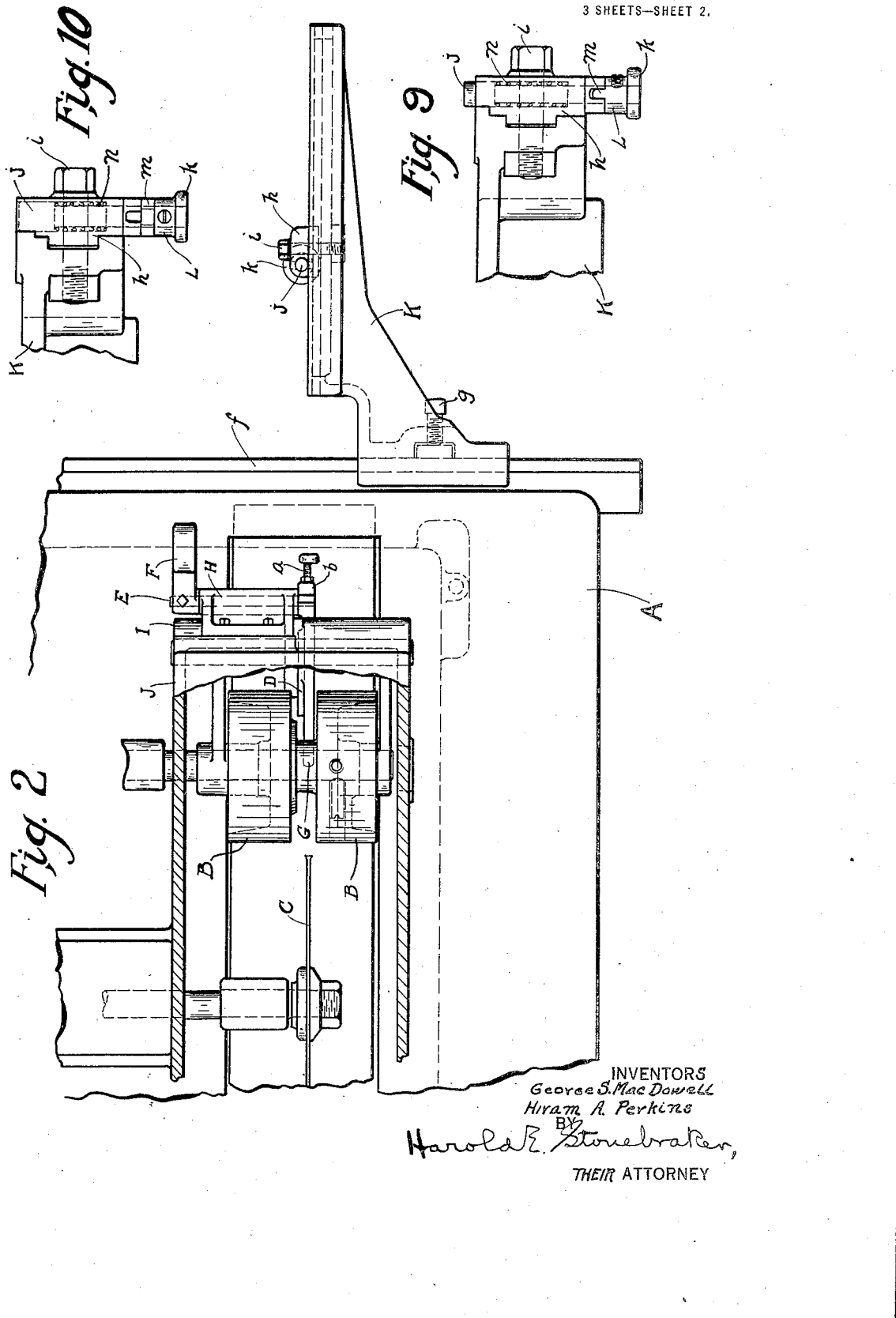

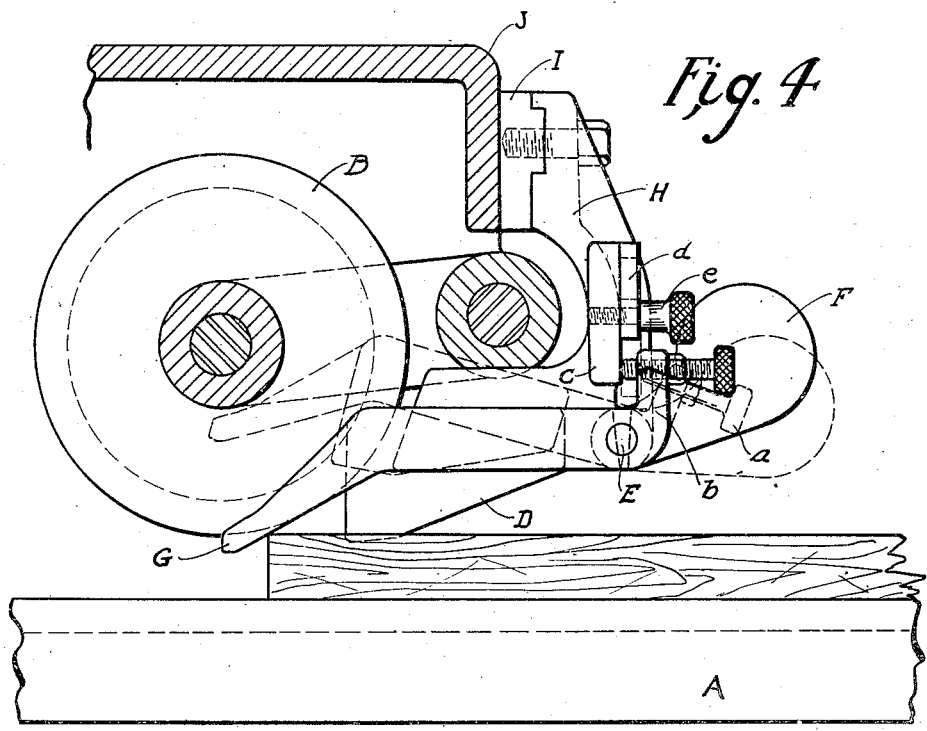
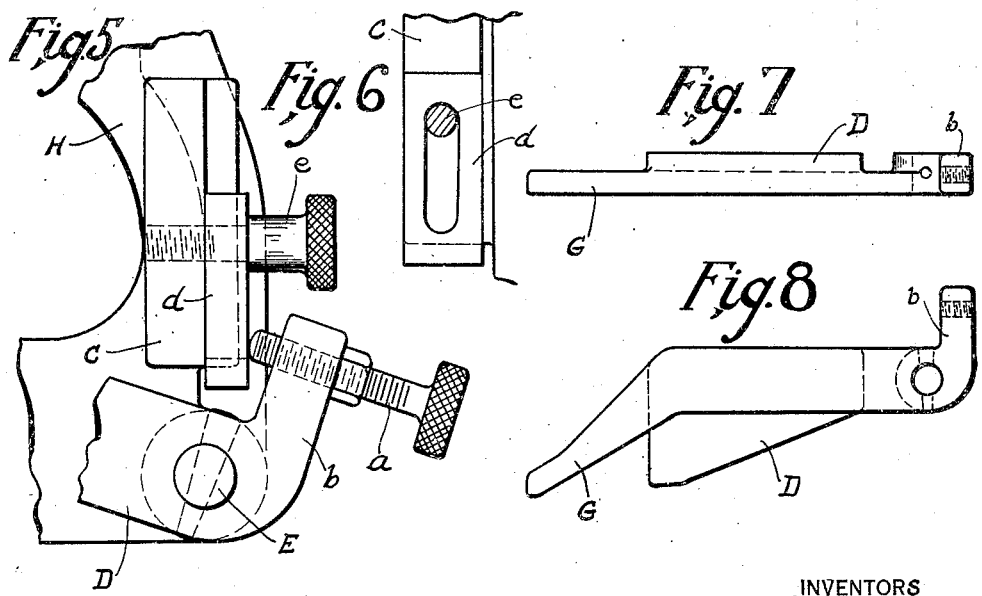

UNITED STATES PATENT OFFICE.

GEORGE S. MacDOWELL, OF NEW YORK, AND HIRAM A. PERKINS, OF ROCHESTER, NEW YORK, ASSIGNORS TO AMERICAN WOOD WORKING MACHINERY COMPANY, OF ROCHESTER, NEW YORK, A CORPORATION OF PENNSYLVANIA.

STOCK-POSITIONING MECHANISM.

1,427,757. Specification of Letters Patent. Patented Aug. 29, 1922.

Application filed March 3, 1921. Serial No. 449,570.

*To all whom it may concern:*

Be it known that we, GEORGE S. MAC-DOWELL and HIRAM A. PERKINS, citizens of the United States of America, residing at New York, in the county of New York and State of New York, and Rochester, in the county of Monroe and State of New York, respectively, have invented certain new and useful Improvements in Stock-Positioning Mechanism, of which the following is a specification.

This invention relates to a positioning mechanism for stock in woodworking machinery, and is intended more particularly for use in connection with an edging saw or similar cutting member.

A purpose of the improvement is to align stock properly before it is fed through the machine, and to accurately position the front end of the stock with reference to the saw or cutting member. Heretofore, this accomplishment has depended upon guess work, or upon the eye of the operator, while by this invention, it is effected mechanically, by mechanism that does not interfere with the usual feeding and cutting operations.

A further object of the invention is to afford a guide arranged to cooperate with the body and rear end of the stock, whereby both ends of the stock can be accurately located and fed, and by positioning the ends properly in the first instance, accurate cutting of the entire edge becomes a certainty.

The invention also includes certain other improvements, as will appear more clearly from the following description, in conjunction with the accompanying drawings, while the novel features of the invention will be pointed out in the claims following the specification.

In the drawings:

Figure 1 is a side elevation of a machine showing the application of the invention in its preferred embodiment.

Figure 2 is a plan view, with parts broken away.

Figure 3 is a front elevation.

Figure 4 is an enlarged vertical sectional view taken longitudinally of the machine and illustrating the normal location of the positioning device in full lines and its elevated position in dotted lines.

Figure 5 is an enlarged side view of the positioning device showing it locked out of operative position.

Figure 6 is an enlarged view in front elevation of the locking plate, and the extension on which it is supported.

Figure 7 is an enlarged plan view of the positioning device.

Figure 8 is an enlarged side elevation of the same.

Figure 9 is an end elevation of the stock guide, showing the stop in normal or elevated position, and Figure 10 is a similar view showing the stop locked in its lower or inoperative position.

The invention consists generally of a positioning device which engages the side edge of a piece of stock at its forward end, until the mechanical feeding devices take hold of the stock. Then the positioning device is automatically moved out of engagement with the stock, so as not to contact with any irregular portions of the side edge between the ends and thus change the lateral position of the stock on the table, with reference to the cutter. Preferably this is accomplished by using a pivoted positioning device or plate which moves vertically away from the table, and carries an elevating member located in rear of the positioning device and in the path of the stock. The effect of this arrangement is to enable positioning the stock sidewise against the positioning device, and as the stock is moved forwardly initially by hand and then by the feeding devices, it engages and raises the elevating member, and with it the positioning device, sufficiently to disengage the latter from the stock by the time the feeding devices engage the stock, and the positioning device is held in such elevated position until the stock has passed out of engagement with the elevating member.

In conjunction with the mechanism just briefly described, there is employed a guide arranged in front of the table for cooperation with the rear end of the stock, so as to enable readily positioning the latter. The guide is adjustable laterally of the table, and is also provided with a longitudinally adjustable stop that can be positioned either above the guide, for positive engagement with the stock, or beneath the surface of the guide when not in use.

In the particular embodiment of the invention herein disclosed which is intended merely to illustrate one example of a practical adaptation and does not limit the invention to the details shown, A designates the table having arranged in usual relationship the feed roll B, and saw C. The stock positioning device is designated at D, and is preferably in the form of a plate, the lower extremity of which when in its lowermost position, is arranged to engage a side edge of the forward end of the stock.

The plate D is fixedly mounted on a shaft E, pivoted in suitable bearings, and having fixed thereon at its opposite end a weighted arm F which acts as a counterbalance, so that but little pressure is required to elevate the plate D away from its normal position.

In order to raise the positioning device away from the stock, an elevating member or dog G is provided, preferably formed integral with the plate D, and located in rear thereof in a recess in the face of feed roll B. This arrangement makes it possible to position the stock against the plate D, just contacting with or slightly in front of the elevating member G. With the position of the stock thus properly determined, the operator pushes it forwardly until it is engaged by the feeding devices which carry it through the machine. During this initial forward movement, the front edge of the stock engages the elevating member G and lifts it, also swinging the plate D upwardly about its pivot. By the time the stock is engaged by the feeding devices, the positioning plate D is lifted entirely free of the stock and is held in such position while the stock travels through the machine in a straight line, following its first position.

The shaft E, and the bearings in which it is mounted are on a support H, which is laterally adjustable on a track I, while the track I is vertically adjustable upon the portion J of the frame of the machine. The normal or lowermost position of the plate D is determined by an adjustable pin or positioning screw $a$, threaded in a lug $b$, and having its end normally in contact with an extension $c$. It is sometimes desirable to hold the positioning device in its elevated position when not in operation, and this can be accomplished by a locking plate $d$ which can be dropped behind the adjustable pin $a$, the plate $d$ being held in its normal elevated position by a cap screw $e$.

Arranged for cooperation with the rear end of the stock is a stock guide designated generally by K. The guide K is laterally adjustable on a track $f$ at the front edge of the table, the guide being held in any position of lateral adjustment by a set screw $g$, and having its upper surface in the plane of the top of the table. The guide K extends in front of the work table and embodies a stock supporting straight edge, the top of which being in the same plane with the top of the table, makes it possible to readily align a piece of stock after the front end has been properly positioned against the plate D.

In some instances, it will be preferable to use the guide merely as a visual aligning means, but provision is also made for a positive stop against which the rear end of the stock can be held.

To this end, the guide is grooved along its straight edge to provide a seat for a carrier $h$, held in place by a bolt $i$, and slidable back and forth to any desired position on the guide. Arranged for vertical movement on the carrier $h$ is a depressible pin or stop $j$, which is actuated upwardly by a spring $n$, and normally occupies a position with its upper end above the top of the guide, so that when the stock rests on the top of the guide, it can be moved into contact with the stop $j$. The lower end of the stop $j$ carries a handle or knob $k$, and a collar $l$ having lugs $m$ engaging recesses in a part of the carrier. By forcing the handle $k$ downwardly against the action of the retaining spring $n$, and turning it until the lugs $k$ are disengaged from their locking recesses, the stop is retained in its downward position.

In the usual operation of the mechanism, a piece of stock is positioned on the table, with its front end engaged at one side against the positioning plate D, and its rear end positioned at the same side against stop $j$, the latter being adjusted on the guide according to the length of the stock. The position of the front and rear ends of the stock being fixed, it is ready to go into the machine and the operator pushes it manually until the feed rolls take hold. During this operation, the positioning plate D is elevated out of engagement with the stock, so that the alignment of the stock can not thereafter be changed by any irregularities in its edge engaging the positioning plate.

While the invention has been described with reference to a preferred arrangement, it is not limited to the disclosure herein, but may be modified, and otherwise adapted, without departing from its fundamental features, comprehended by the following claims.

We claim:

1. The combination with a woodworking machine, of a positioning device against which is engaged a side edge of the stock as the latter is positioned for feeding, and means for automatically moving the positioning device out of engagement with the stock as the latter is fed into the machine.

2. The combination with a woodworking machine, of a positioning device against which a side edge of the stock is engaged as it is positioned for feeding, and means against which the front edge of the stock engages for automatically moving said positioning device out of engagement with the stock as the latter is fed into the machine.

3. The combination with a woodworking machine, of a positioning device against which a side edge of the stock is engaged as it is positioned for feeding into the machine, and a means carried by the positioning device and controlled by the forward edge of the stock for moving said positioning device out of engagement therewith.

4. The combination with the table of a woodworking machine, of a positioning device movable vertically above the table, and against which a side edge of the stock is engaged as it is positioned for feeding, said positioning device being automatically moved upwardly by the stock as it is fed into the amchine.

5. The combination with the table of a woodworking machine, of a positioning device movable vertically above the table and arranged to engage a side edge of the stock as the latter is positioned for feeding, and means controlled by the forward edge of the stock for elevating said positioning device out of engagement with the stock.

6. The combination with the table of a woodworking machine, of a positioning device movable vertically above the table and arranged to engage a side edge of the stock as the latter is positioned for feeding, and means carried by the positioning device and located in the path of the front edge of the stock for elevating the positioning device out of engagement with the stock.

7. The combinatiton with the table of a woodworking machine, of a pivotally mounted positioning device arranged to engage a side edge of the stock, and an elevating member carried by the positioning device and extending in rear thereof, said elevating member lying in the path of a gauged part of the stock so as to be lifted thereby and acting to correspondingly elevate the positioning device above the stock.

8. The combination with the table of a woodworking machine and a recessed stock feeding roll, of a pivotally mounted positioning device arranged to engage a side edge of the stock, and an elevating member carried by the positioning device and extending in rear thereof in the recess of said feeding roll, said elevating member lying in the path of a gauged part of the stock so as to be lifted thereby and acting to correspondingly elevate the positioning device above the stock, the elevating member being so arranged with reference to the stock feeding roll that the stock is gripped by the feeding mechanism before the positioning device is elevated, 9. The combination with the table of a woodworking machine, of a stop located in advance of said table for cooperation with the rear end of the stock, said stock being positioned with its rear end against the stop before entering the machine, and disengaging said stop as it is fed into the machine.

10. The combination with the table of a woodworking machine, of a stop arranged in advance of the table and adjustable at different distances from the table in accordance with the length of the stock to be fed, said stock being positionable with its rear end against the stop before it enters the machine and disengaging said stop as it is fed into the machine.

11. The combination with the table of a woodworking machine, of a guide extending in front thereof, a carrier adjustable longitudinally of the guide in accordance with the length of the stock to be fed, and a stop mounted on the carrier for engagement with the rear end of the stock as it is positioned for feeding into the machine, the stock disengaging the stop as it is fed into the machine.

12. The combination with the table of a woodworking machine, of a guide extending in front thereof and adjustable laterally on the table, a carrier adjustable longitudinally of the guide in accordance with the elength of the stock to be fed, and a stop mounted on the carrier and arranged to engage and position the rear end of the stock as it is positioned for feeding, the stock disengaging the stop as it is fed into the machine.

13. The combination with the table of a woodworking machine, of a guide extending in front thereof and adjustable laterally on the table, a carrier adjustable longitudinally of the guide in accordance with the length of the stock to be fed, a stop depressibly mounted on the carrier, means for holding the stop in its lower position, said stop when in its upper position serving to engage and position the rear end of the stock, said stock disengaging the stop as it is fed into the machine.

14. The combinatiton with the table of a woodworking machine, of a guide extending in front thereof and adjustable laterally on the table, a carrier adjustable longitudinally of the guide in accordance with the length of the stock to be fed, and a stop depressibly mounted on the carrier, said stop when in its upper position serving to engage and position the rear end of the stock, which latter as it is fed into the machine disengages the stop.

In witness whereof, the parties have hereunto signed their names.

GEORGE S. MacDOWELL.
HIRAM A. PERKINS.